United States Patent
Dudar

(10) Patent No.: US 11,453,306 B2
(45) Date of Patent: Sep. 27, 2022

(54) ENQUEUING ELECTRIC VEHICLES FOR IMPROVED FLEET AVAILABILITY

(71) Applicant: Ford Global Technologies, LLC, Dearborn, MI (US)

(72) Inventor: Aed M. Dudar, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 121 days.

(21) Appl. No.: 16/954,248

(22) PCT Filed: Dec. 18, 2017

(86) PCT No.: PCT/US2017/067133
§ 371 (c)(1),
(2) Date: Jun. 16, 2020

(87) PCT Pub. No.: WO2019/125395
PCT Pub. Date: Jun. 27, 2019

(65) Prior Publication Data
US 2021/0370794 A1    Dec. 2, 2021

(51) Int. Cl.
*B60L 53/68* (2019.01)
*H04W 4/46* (2018.01)
(Continued)

(52) U.S. Cl.
CPC ............ *B60L 53/68* (2019.02); *B60L 53/126* (2019.02); *B60L 53/65* (2019.02); *B60L 53/66* (2019.02); *H04W 4/46* (2018.02); *B60L 53/12* (2019.02)

(58) Field of Classification Search
CPC .......... B60L 53/68; B60L 53/65; B60L 53/66; B60L 53/12; B60L 53/126; H04W 4/46
(Continued)

(56) References Cited

U.S. PATENT DOCUMENTS

| 8,717,170 B1 * | 5/2014 | Juhasz | B60L 53/63 340/5.2 |
| 10,023,057 B2 | 7/2018 | Sobota Rodriguez | |

(Continued)

FOREIGN PATENT DOCUMENTS

WO    2016/170085 A1    10/2016

OTHER PUBLICATIONS

International Search Report of the International Searching Authority for PCT/US2017/067133 dated Feb. 26, 2018.

*Primary Examiner* — Richard Isla
*Assistant Examiner* — Manuel Hernandez
(74) *Attorney, Agent, or Firm* — Brandon Hicks; Eversheds Sutherland (US) LLP

(57) ABSTRACT

Electric vehicles arriving at a charging station transmit their state of charge, capacity, and departure time to a computer system. Vehicles are sorted into tiers according to departure time and sorted within tiers according to charging time based on state of charge and capacity. The vehicles are then assigned to queues according to the tiers and ordering within tiers such that vehicles with sooner departure times and shorter charge times are given priority. Where there are multiple queues, vehicles with a shorter charge time may be assigned to a first queue while remaining vehicles are assigned to one or more other queues. Charging stations may have different capacity and vehicles with higher priority according to sooner departure time and shorter charging time may be assigned to faster chargers.

16 Claims, 7 Drawing Sheets

(51) Int. Cl.
  *B60L 53/66* (2019.01)
  *B60L 53/65* (2019.01)
  *B60L 53/126* (2019.01)
  *B60L 53/12* (2019.01)

(58) Field of Classification Search
  USPC .......................................................... 320/109
  See application file for complete search history.

(56) References Cited

U.S. PATENT DOCUMENTS

| | | | |
|---|---|---|---|
| 10,124,682 B2* | 11/2018 | Tsuchiya | B60L 53/14 |
| 2012/0245750 A1 | 9/2012 | Paul et al. | |
| 2014/0249692 A1 | 9/2014 | Levien et al. | |
| 2015/0202975 A1* | 7/2015 | Solomon | H02J 13/0003 |
| | | | 705/7.26 |
| 2016/0311329 A1 | 10/2016 | Rodriguez | |
| 2016/0352113 A1 | 12/2016 | Zhao et al. | |
| 2016/0358472 A1* | 12/2016 | Bezak | G06Q 20/3224 |
| 2016/0380440 A1* | 12/2016 | Coleman, Jr. | H02J 7/00711 |
| | | | 700/295 |
| 2017/0320399 A1* | 11/2017 | Yuan | B60L 55/00 |
| 2018/0189683 A1* | 7/2018 | Newman | G01C 21/3605 |
| 2019/0095872 A1* | 3/2019 | Lalwani | G05D 1/0225 |
| 2020/0262307 A1* | 8/2020 | Rosene | B60L 53/67 |
| 2022/0172129 A1* | 6/2022 | Hou | G06Q 10/02 |

\* cited by examiner

ENQUEUING ELECTRIC VEHICLES FOR IMPROVED FLEET AVAILABILITY

BACKGROUND

Field of the Invention

This invention relates to wireless charging of electric vehicles, particularly autonomous vehicles.

Background of the Invention

Electric vehicles provide significant advantages in terms of emissions and energy efficiency. Improvements in battery technology have improved the range and overall utility of electric vehicles. The downside of electric vehicles is the long charging time, which is many times longer than for combustion vehicles. One convenient option for recharging electric vehicles is wireless charging wherein an inductive coil at a charging station induces current in a corresponding coil on the vehicle, which is used to charge the vehicle's battery.

The systems and methods disclosed herein provide an improved approach for implementing charging of electric vehicles, particularly autonomous electric vehicles.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1A:
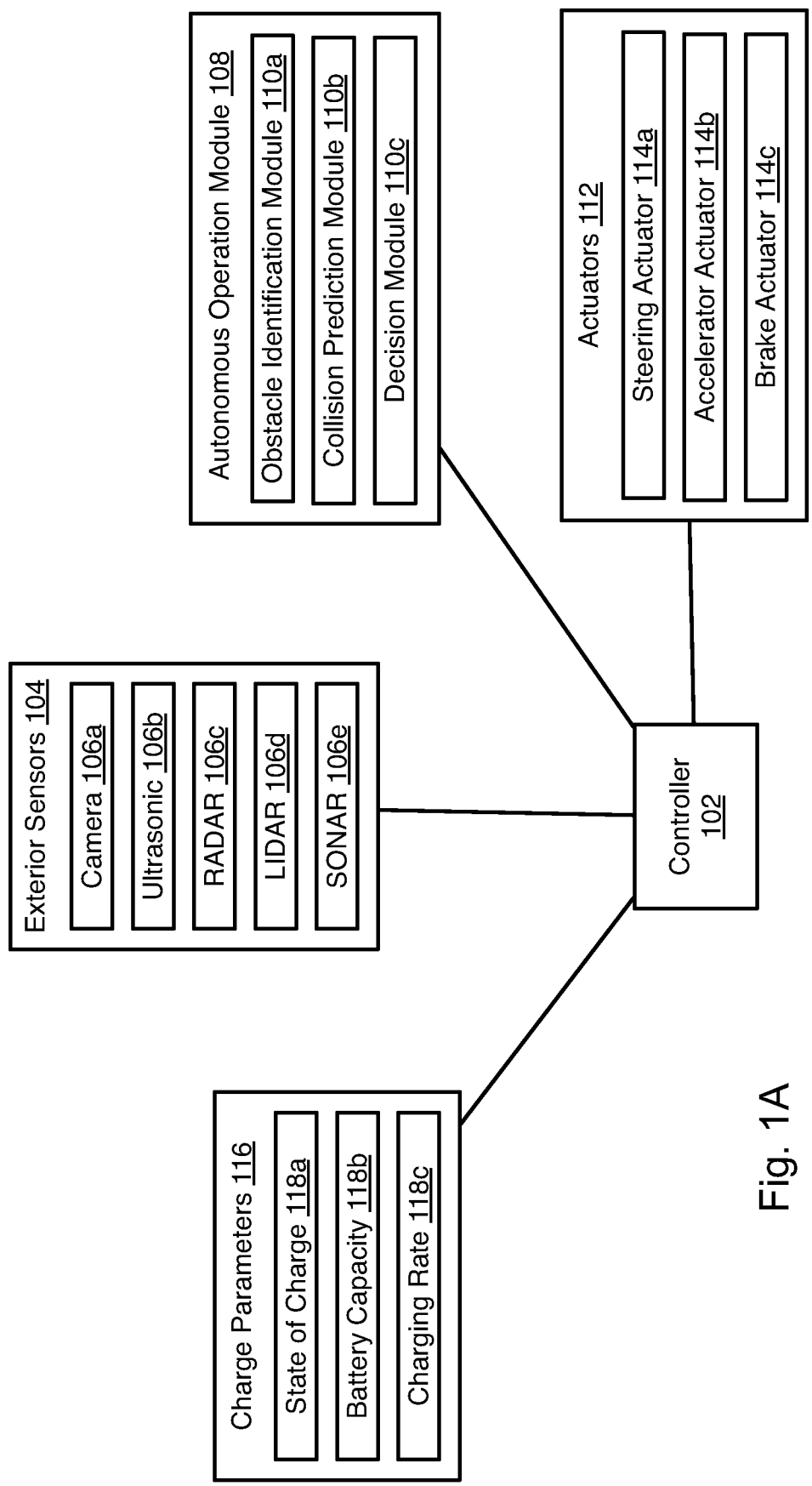
FIG. 1A is a schematic block diagram of components implementing an autonomous vehicle for use in accordance with an embodiment of the present invention.

Referring to FIG. 1A, a vehicle used according to the methods disclosed herein may be may be a small capacity vehicle, such as sedan or other small vehicle or a large capacity vehicle such as a truck, bus, van, large sport utility vehicle (SUV), or the like.

The vehicle may include any vehicle known in the art. The vehicle may have all of the structures and features of any vehicle known in the art including, wheels, a drive train coupled to the wheels, an engine coupled to the drive train, a steering system, a braking system, and other systems known in the art to be included in a vehicle.

As discussed in greater detail herein, a controller 102 of the vehicle may perform autonomous navigation and collision avoidance. The controller 102 may receive one or more outputs from one or more exterior sensors 104. For example, one or more cameras 106a may be mounted to the vehicle and output image streams received to the controller 102.

The exterior sensors 104 may include sensors such as an ultrasonic sensor 106b, a RADAR (Radio Detection and Ranging) sensor 106c, a LIDAR (Light Detection and Ranging) sensor 106d, a SONAR (Sound Navigation and Ranging) sensor 106e, and the like.

The controller 102 may execute an autonomous operation module 108 that receives the outputs of the exterior sensors 104. The autonomous operation module 108 may include an obstacle identification module 110a, a collision prediction module 110b, and a decision module 110c. The obstacle identification module 110a analyzes the outputs of the exterior sensors and identifies potential obstacles, including people, animals, vehicles, buildings, curbs, and other objects and structures. In particular, the obstacle identification module 110a may identify vehicle images in the sensor outputs.

The collision prediction module 110b predicts which obstacle images are likely to collide with the vehicle based on its current trajectory or current intended path. The collision prediction module 110b may evaluate the likelihood of collision with objects identified by the obstacle identification module 110a. The decision module 110c may make a decision to stop, accelerate, turn, etc. in order to avoid obstacles. The manner in which the collision prediction module 110b predicts potential collisions and the manner in which the decision module 110c takes action to avoid potential collisions may be according to any method or system known in the art of autonomous vehicles.

The decision module 110c may control the trajectory of the vehicle by actuating one or more actuators 112 controlling the direction and speed of the vehicle. For example, the actuators 112 may include a steering actuator 114a, an accelerator actuator 114b, and a brake actuator 114c. The configuration of the actuators 114a-114c may be according to any implementation of such actuators known in the art of autonomous vehicles.

In embodiments disclosed herein, the autonomous operation module 108 may perform autonomous navigation to a specified location, autonomous parking, and other automated driving activities known in the art.

The controller 102 may maintain and transmit various charge parameters 116 describing the battery of the electric vehicle. For example, a state of charge (SOC) 118a may indicate an amount of energy remaining in the battery of the vehicle, such as in terms of a percentage of total charge, kilowatt hour (kWH) value, Amp hour (Ah) value, kilojoule (kJ) value, or some other measure of remaining energy.

The charge parameters 116 may further include a capacity 118b of the battery, which may also be expressed in kWH, Ah, kJ or some other measure of energy or electric charge.

The charge parameters 116 may further include a charging rate 118c. The charging rate 118c may indicate a speed at which the battery may be charged, such as in form of a C-rate (coulomb rate), kilowatts (kW), Amps, Joules, or some other rate at which energy or current may be received by the battery as known in the art of battery design.

Figure 1B:
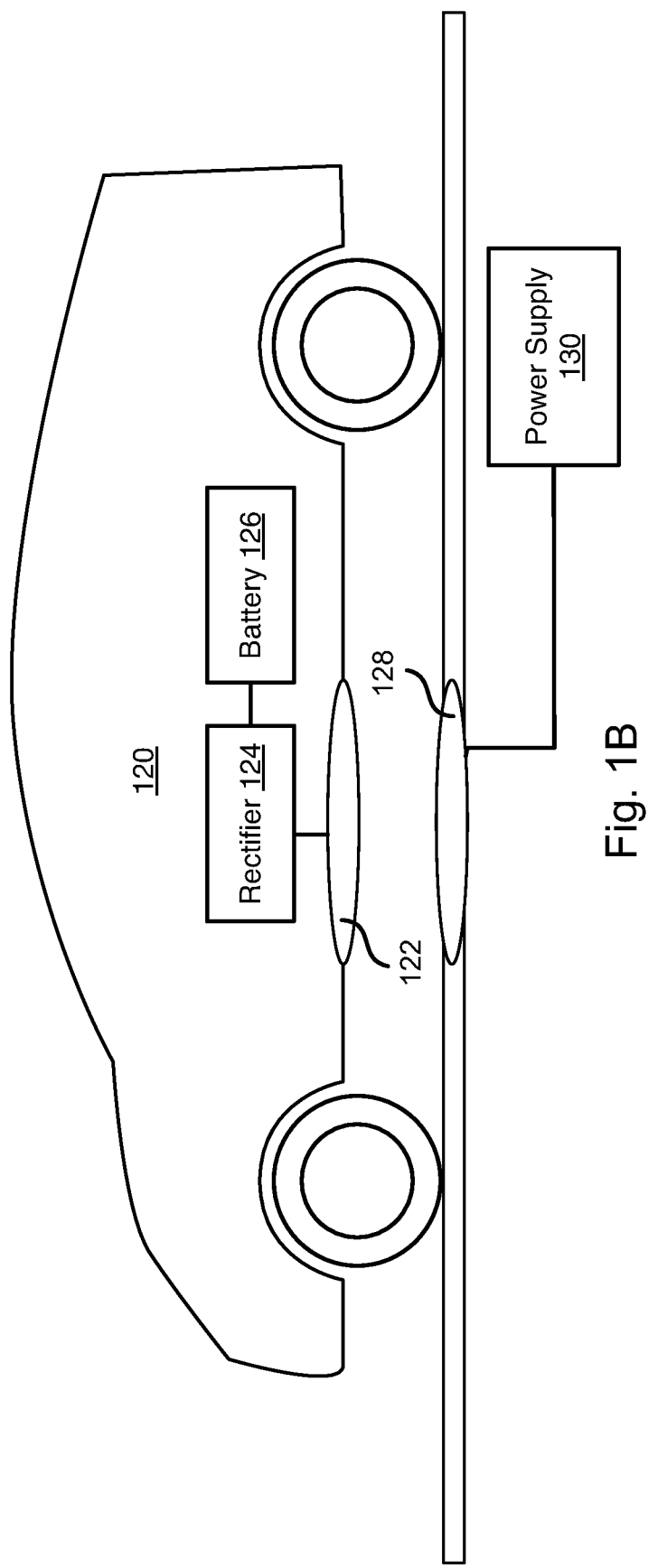
FIG. 1B is a schematic block diagram showing a wireless charging station.

Referring to FIG. 1B, a vehicle 120 may include some or all of the components described above with respect to FIG. 1A. In addition, the vehicle 120 may incorporate an inductive coil 122 coupled to a rectifier 124 that converts alternating current in the coil 122 to a direct current supplied to a battery 126 for charging. The implementation of the components 122, 124, 126 may be according to any approach known in the art for performing wireless charging.

A charging station may include one or more inductive coils 128 driven by a power supply 130, such as a municipal power grid, photovoltaic panels, or some other source of electrical power. As known in the art, alternating current through the inductive coils 128 creates a magnetic field which induces current in the coil 122 positioned over the coil 128.

The illustrated structures of 1B may be implemented using charge controllers coupled to one or both of the coils 128 and battery 126 for controlling a rate of charge for safety and to prolong the life of battery. The charge controllers may provide an indication to the controller 102 when charging is complete.

Wireless charging stations are particularly useful for autonomous vehicles inasmuch as a human operation is not required to plug in the vehicle to charge.

Figure 2:
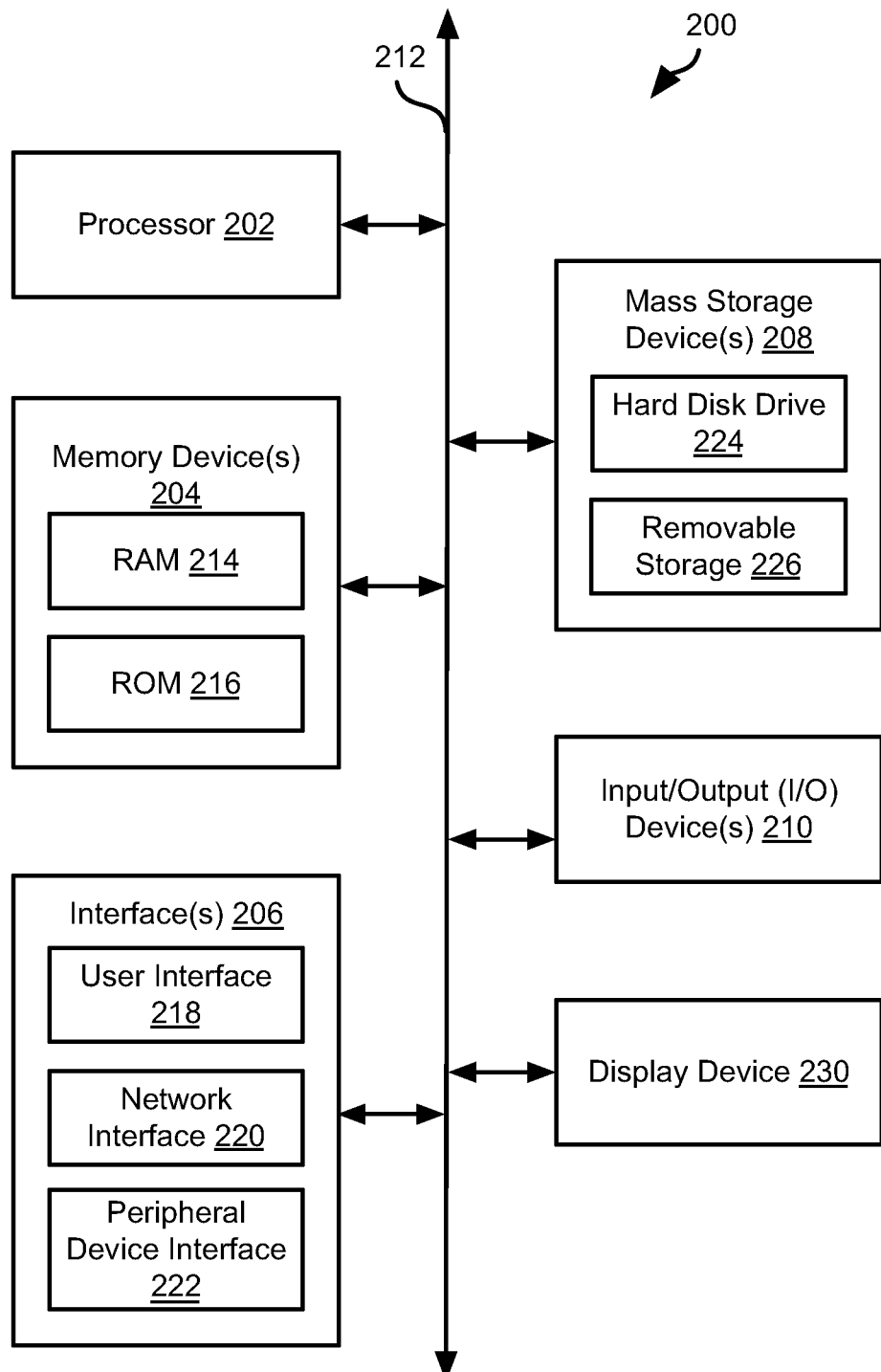
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein for managing assignment of vehicles to queue at a charging facility. The controller 102 of a vehicle may have some or all of the attributes of the computing device 200.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
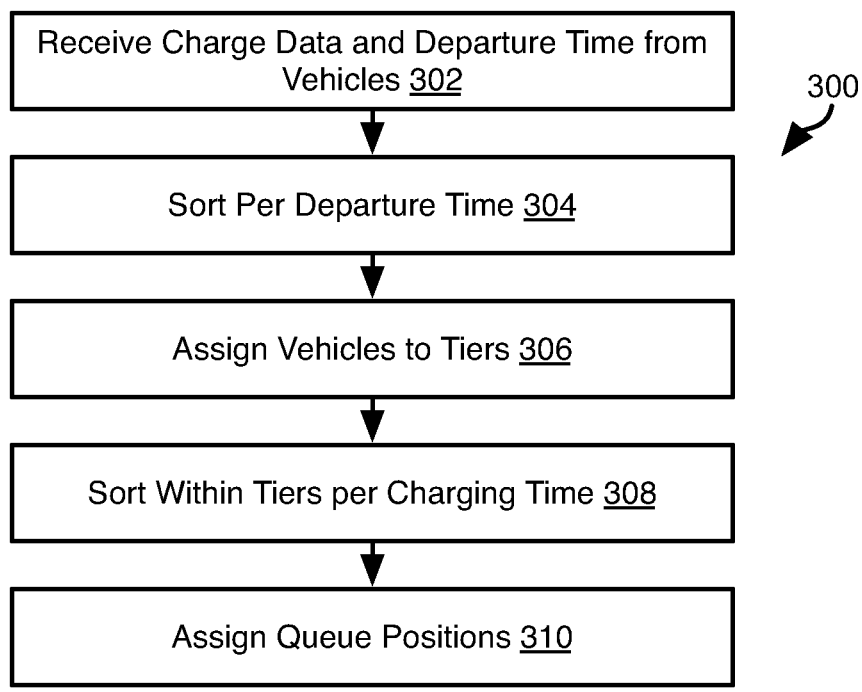
FIG. 3 is a process flow diagram of a method for ordering vehicles in a queue for a charging station in accordance with an embodiment of the present invention.

Referring to FIG. 3, the illustrated method 300 may be executed by a computer system 200 with respect to data received from a plurality of vehicles that arrive at a charging station including one or more queues each with a corresponding charging coil 128. The method 300 presumes that multiple vehicles may arrive at a charging station at or around the same time. Accordingly, the method 300 may be executed with respect to multiple vehicles. The vehicles may be located in a holding queue or entrance of a charging station or be en route to the charging station at the time of execution of the method 300 and be assigned a place in a queue to use one or more charging stations according to the method 300.

As vehicles arrive at a charging station, or are within communication range of the charging station, the vehicles may transmit charge data to the computer system 200, such as using a wireless communication protocol such as DSRC (digital short range communication), WI-FI, BLUETOOTH, cellular data communication, or some other wireless communication approach. The charge data may include some or all of the charge parameters 116. The vehicles may be part of a fleet traversing scheduled routes and/or arriving at specified pick-up and drop-off location. Accordingly, each vehicle may have an intended departure time at which the vehicle must depart into arrive at a scheduled location. The vehicles may therefore transmit this departure time along with the charge data using a wireless vehicle to vehicle (V2V) or vehicle to everything (V2X) communication protocol. Instructions from the computer system 200 to vehicles may also be performed using a V2X protocol.

The computer system 200 receives 302 the charge data and departure time for the vehicles. The computer system 200 may then sort 304 the vehicles according to departure time, e.g. order the vehicles according to departure time from soonest to latest or from latest to soonest.

The computer system 200 may then assign 306 the vehicles to tiers. The tiers may be of fixed size or based on a fixed threshold. For example, the N vehicles with the N soonest departure times may be assigned to a first tier and removed from further consideration, the M (M equal or not equal to N) vehicles of the remaining vehicles with the soonest departure times may be assigned to a second tier and removed from further consideration, and so one for any number of tiers until no vehicles remain to be assigned to a tier.

In an alternative approach, the first tier is populated with vehicles with a time to departure below a first threshold, the second tier is populated vehicles with a time to departure between the first threshold and a second threshold higher than the first threshold, and so on until no vehicles remain to be assigned to a tier. The thresholds may be predetermined static values or based on a function of the times of departure of the vehicles.

In one simple embodiment, only two tiers are used. In other embodiments, three or more tiers may be used.

Within each tier, the vehicles assigned to the tier may be sorted 308 according to charging time. The charging time for a vehicle may be calculated according to the charge data. In particular, for a given SOC, capacity, and charging rate for a battery and a power output of a charging station, a time to charge a battery may be estimated using any approach known in the art of rechargeable batteries. For example, the charging time T may be calculated as T= [(100%−SOC)*Battery Capacity]/(Wireless Charger Output Rate), where Battery Capacity is in units of Amp Hours and the Wireless Charger Output Rate is in terms of Amps.

The time to charge may be a time to charge to capacity or a time to charge to a sufficient level to complete a desired route plus an excess charge for contingencies.

Figure 4:
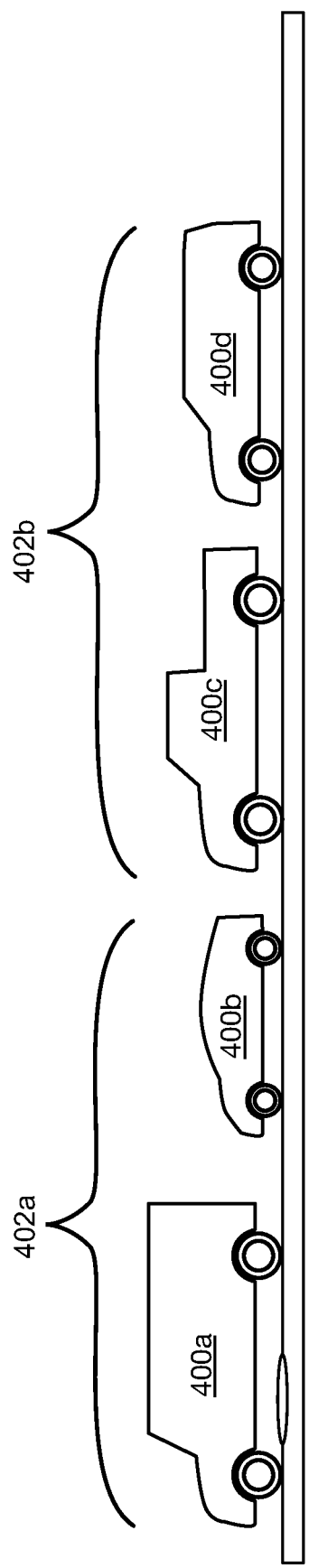
FIG. 4 is a process flow diagram illustrating tiered arrangement of vehicles in a queue in accordance with an embodiment of the present invention.

The vehicles may then be assigned 310 queue positions according to the tier assignments 306 and sorting 308. For example, as shown in FIG. 4, vehicles 400a, 400b that are assigned to a first tier 402a are placed first in the queue. Vehicle 400a, having the shortest charge time, is placed first in the queue followed by vehicle 400b with a longer charge time.

Vehicles 400c, 400d in a second tier 402b are placed after vehicles in the first tier 402a. Again, the first vehicle 400c for the second tier 402b has a shorter charge time than the vehicle 400d.

The illustrated example includes only two tiers and only two vehicles per tier. However, any number of vehicles per tier and any number of tiers may be implemented using the above-described approach.

Once the ordering is assigned 310, vehicles may be instructed by the computer system to line up in the queue according to the ordering. This may be accomplished by sending instructions to vehicles to join the queue one at a time according to the ordering. Alternatively, the ordering may be transmitted to all of the vehicles, which will then use V2V (vehicle to vehicle) communication to autonomously arrange themselves in the queue according to the ordering.

The method 300 may be executed repeatedly as vehicles arrive at a charging station, such as every N minutes or once a minimum number of vehicles notify the computer system 200 of an intent to charge at the charging station, whichever comes first.

Note that in the case that there is only one vehicle that needs to be added to the queue, or the number of vehicles is less than or equal to the number of charging stations not currently in use, a vehicle may simply be assigned to a charging station randomly or on a first-come-first-served basis and prioritization according to the method 300 may be omitted. Alternatively, vehicles may be instructed that the number of charging stations is larger than or equal to the number of vehicles that have indicated an intent to use the charging stations. The vehicles may then autonomously select an unoccupied charging station.

However, where charging stations have different capacity (e.g., some charging stations are capable of charging faster than others), then the assignment may be based on charging data and departure times even when the number of charging stations is less than or equal to the number of vehicles that have indicated an intent to recharge but have not yet been assigned to a charging station.

In such as case, a vehicle with a sooner departure time will be assigned to a faster charger than a vehicle with a later departure time. In the case of a tie, the vehicle with the faster charge time will be assigned to a faster charger than a vehicle with a slower charge time.

Figure 5:
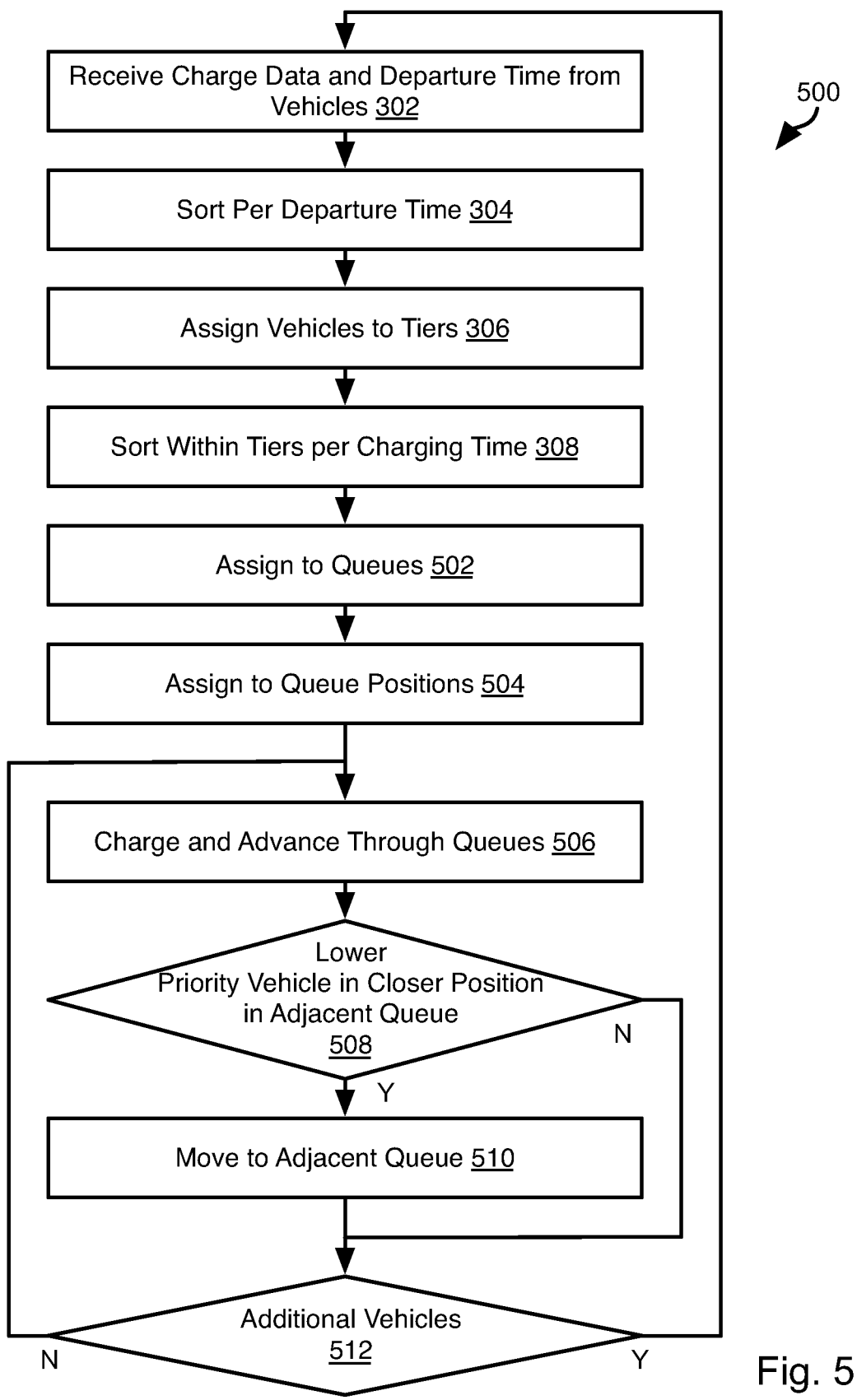
FIG. 5 is a process flow diagram of a method for managing assignment of vehicles to multiple queues for multiple charging stations in accordance with an embodiment of the present invention.

FIG. 5 illustrates a method 500 for assigning vehicles to multiple queues with multiple corresponding charging stations. The method 500 may be executed by the computer system 200 with respect to multiple vehicles that have indicated an intent to charge at the charging station but have not yet been assigned to queues.

The method 500 may include receiving 302 charge data and departure times for the vehicles, sorting 304 the vehicles according to departure time, assigning 306 vehicles to tiers, and sorting 308 vehicles within tiers according to charging time. Steps 302-308 may be performed in the same manner as for the method 300.

The method 500 may further include selecting 502 a queue for each vehicle and assigning 504 each vehicle to a position within each queue. Various approaches may be used to implement the assignments 502, 504.

In one approach, one or more of the queues are reserved for vehicles with fast charging times (e.g., an "express lane"). Accordingly, vehicles with charging times below a threshold may be assigned to that queue, such as in an ordering according to tiers, e.g., vehicles from tier one meeting the charging time threshold are placed in the queue first followed by vehicles from tier two meeting the charging time threshold, and so on for any number of tiers.

As noted above, where there are multiple charging stations they may have multiple charging rates. Accordingly, the reserved queue may be for the charger with the fastest charging rate in some embodiments. Where there are multiple charging stations with multiple charging rates, there are therefore multiple charging times for a vehicle, depending on the charger used. In some embodiments, the charging times for vehicles are calculated based on the charging rate of the fastest charger. In this manner, the vehicles capable of taking advantage of the faster charging rate will be given higher priority and a higher likelihood of assignment to the faster charger.

In another approach, vehicles are assigned to queues in a round robin approach, e.g., vehicles from tier one are added to the queues in a round robin assignment, vehicles from tier two are then added in the same manner, and so on for any number of tiers.

In another approach, each queue corresponds to a tier. Accordingly, tier one vehicles are assigned to a first queue, tier two vehicles are assigned to a second queue, and so on for any number of tiers. As noted above, where there are multiple charging stations they may have multiple charging rates. Accordingly, the first tier may be assigned to the fastest charger, the second tier may be assigned to the second fastest charger, and so on for any number of chargers.

Vehicles may be instructed to proceed to assigned queues according to the assigned positions. As noted above, this may include transmitting the instructions one at a time in the order for each queue or by transmitting the queue assignments and ordering to the vehicles and allowing the vehicles to communicate with one another in order to arrange themselves autonomously in the assigned queues according to the assigned ordering.

The method 500 may then include charging vehicles 506 at the charging stations in the ordering of the queues for each charging station. Vehicles will then advance through the queue and drive off following charging. In some instances, a vehicle may end charging prior to being charged to capacity, such as where the state of charge is sufficient to complete a scheduled trip and departure is necessary in order to arrive at a destination in the scheduled trip at a scheduled time.

Throughout the charging process 506, the method 500 may include evaluating 508 whether a lower priority vehicle in a first queue is at a same or closer position relative to a front of a queue than a higher priority vehicle in an adjacent queue. Priority in this case may be based exclusively on charging time or departure time or based on a combination of these factors. Charging time is a particularly suitable basis for priority.

Figure 6:
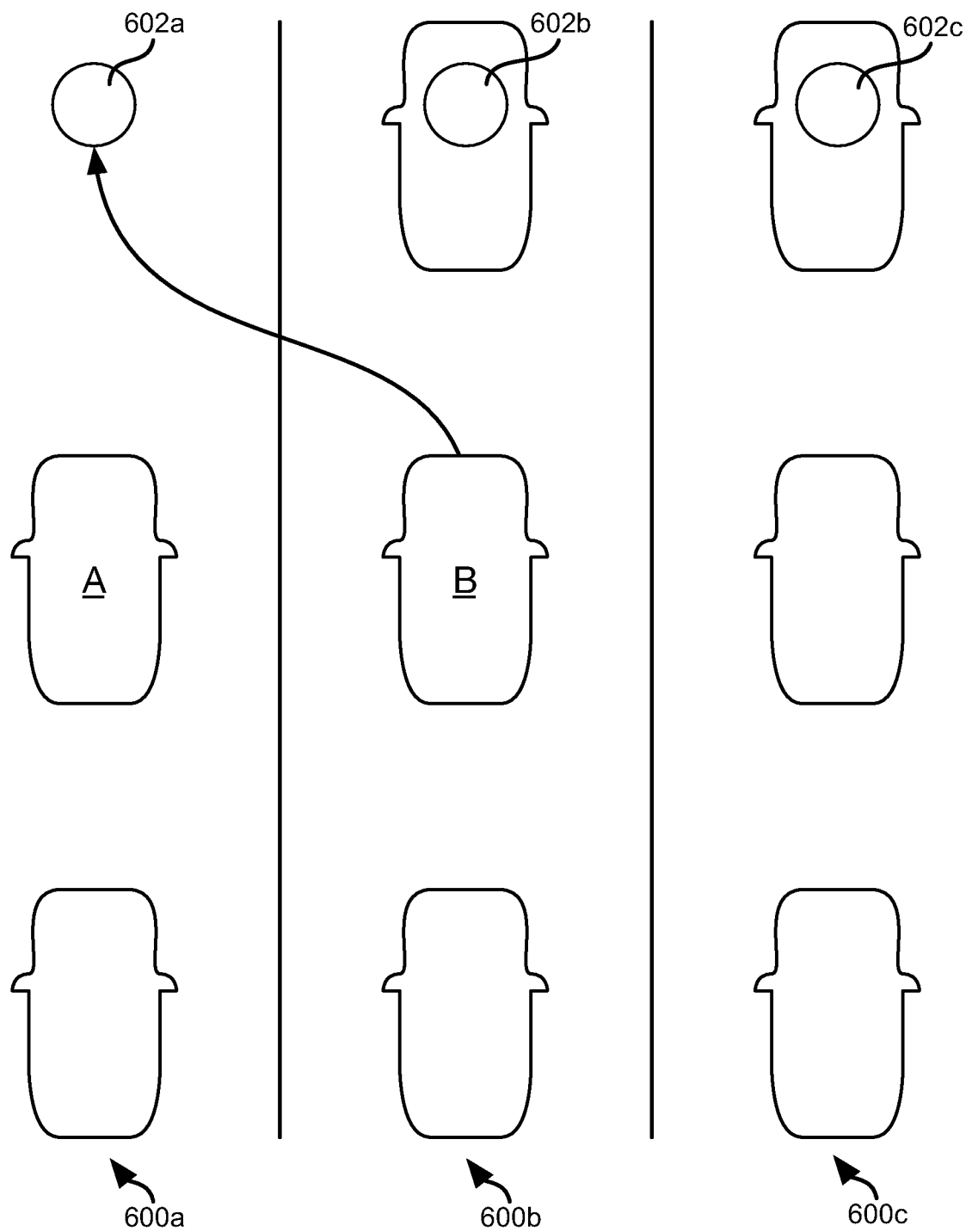
FIG. 6 is a process diagram illustrating managing of multiple queues for multiple charging stations in accordance with an embodiment of the present invention.

This is illustrated in FIG. 6, in which vehicles are arranged in queues 600a-600c, each corresponding to a charging coil 602a-602c. In this example, vehicle A is the first vehicle in queue 600a and the charging station 602a is currently unoccupied. Vehicle B in this example has a higher priority.

If the condition of step 508 is met, the vehicle with higher priority is instructed to move 510 in front of the lower priority vehicle. In the example of FIG. 6, vehicle B will therefore move in front of vehicle A in queue 600a and will use the charging station 602a first.

To reduce the number of queue changes, queue changes may be constrained to be performed only in the circumstances shown in FIG. 600: the position over a charging coil in a first queue is currently unoccupied and a vehicle in an adjacent queue (no intervening queues) has a higher priority than the vehicle in the first queue closest to the charging coil but not yet positioned over the charging coil.

In other embodiments, any time a space opens up in front of a first vehicle due to the queue advancing in front of the first vehicle, a higher priority second vehicle from an adjacent queue may be instructed and permitted to move into the space.

If the evaluation of step 508 is negative, then no change is made to the queue arrangement. Step 508 may be performed again periodically, such as upon completion of charging of one or more vehicles at a charging station, upon expiration of a time period, or within some threshold time prior to an expected completion of charging of a vehicle that is currently charging.

If more vehicles are found 512 to have indicated an intent to use the charging station and have not yet been assigned to queues, these vehicles may be assigned to queues starting at step 302.

Various modifications of the above described approach may be implemented. For example, entities associated with vehicles may pay a fee in order to obtain a higher priority, e.g. be placed in a higher priority tier (lower tier number in the above embodiments) or be placed closer to the front of a queue for a tier. In another example, entities associated with vehicles may pay a fee in order to obtain assignment to a faster charging station.

In some embodiments, the methods may be performed by or facilitated by a drone flying above the charging station and observing the positions of vehicles in and around the charging station. Such information may then be used to assign vehicles to queues according to the methods described herein and to instruct vehicles regarding paths to arrive at queues that will avoid collisions with other vehicles.

In some instances, vehicles may include solar panels that charge a battery of the vehicles. Accordingly, the charging time of such vehicles may change (decrease) while waiting in a queue. Accordingly, the priority of such vehicles may increase, resulting in reordering according to steps 508 and 510. In such cases, these vehicles may periodically retransmit their charge data, specifically the state of charge, to the computer system 200 such that the priority of these vehicles may be adjusted accordingly and used during iterations of step 508.

As is apparent from the above disclosure, vehicles with sooner departure times and faster charging times are given higher priority. In this manner, the availability of autonomous vehicles in a fleet is increased and timely arrival of vehicles at destinations is promoted. The prioritization approach described above reduces the likelihood that a vehicle with a low state of charge and high capacity will cause delays for vehicles with urgent departure times and shorter charging times.

The methods described above are particularly useful for autonomous vehicles but also may be implemented using human-operated vehicles or a mix of human-operated and autonomous vehicles. For example, human operators may be instructed to move to positions in queues indicated according to the above-described methods.

The methods described above are particularly suited for vehicles that are operated by the same entity inasmuch as fairness considerations may be disregarded for any individual vehicle in order to promote overall fleet availability. However, the increased throughput may also be beneficial for vehicles that are owned and controlled by different entities. For example, orderings according to the methods described herein may be used unless it would result in an above-threshold change (e.g., increase in wait time or increase in place in line) in ordering for a vehicle as compared to a first-come-first served ordering, where the change threshold is some predetermined value.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising, by a computer system:
receiving first charge data from a first vehicle, second charge data from a second vehicle, and third charge data from a third vehicle;
receiving first departure time data from the first vehicle, second departure time data from the second vehicle, and third departure time data from the third vehicle;
determining that the first departure time data and the second departure time data are less than a first threshold value and the third departure time data is greater than the first threshold value;
determining, based on the first charge data and the second charge data, that a first charge time associated with the first vehicle is less than a second charge time associated with the second vehicle;
sorting the first vehicle and the second vehicle into a first tier and the third vehicle into a second tier, wherein the first tier includes vehicles with a departure time less than the first threshold value, and wherein the second tier includes vehicles with a departure time greater than the first threshold value;

assigning the first vehicle and the second vehicle to a first queue associated with a first charging coil at a charging location;

assigning the third vehicle to a second queue associated with a second charging coil at the charging location;

assigning a fourth vehicle to the first queue and a fifth vehicle to the second queue;

determining that the fourth vehicle at a third position in the first queue has a shorter estimated charging time or a sooner departure time than the fifth vehicle in a second position in the second queue, the second position being closer to a front of the second queue than the third position is to a front of the first queue; and assigning the fourth vehicle to the second position in the second queue in front of the fifth vehicle.

2. The method of claim 1, wherein the first charge data, second charge data, and third charge data includes a state of charge and a battery capacity.

3. The method of claim 2, wherein the first charge data, second charge data, and third charge data further includes a charging speed of the first vehicle, the second vehicle, and the third vehicle; and wherein calculating an estimated charging time for the first vehicle, the second vehicle, and the third vehicle comprises calculating the estimated charging time according to the state of charge, battery capacity, and charging speed of the first vehicle, the second vehicle, and the third vehicle.

4. The method of claim 1, wherein the first charging coil for the first queue has a faster charging speed than the second charging coil for the second queue.

5. The method of claim 1, wherein the first vehicle is an autonomous vehicle.

6. The method of claim 1, wherein receiving the first charge data and the first departure time data from the first vehicle comprises receiving the first charge data and first departure time data over a vehicle-to-vehicle communication protocol.

7. The method of claim 1, further comprising:

assigning the first vehicle a first position within the first queue and the second vehicle a second position within the first queue, wherein assigning the first vehicle the first position is based on the determination that the first charge time associated with the first vehicle is less than the second charge time associated with the second vehicle.

8. The method of claim 1, wherein assigning the first vehicle and the second vehicle to the first queue and assigning the third vehicle to the second queue is facilitated using a drone at the charging location.

9. The method of claim 1, wherein the first queue includes a fourth vehicle, and wherein the method further comprises:

receiving fourth charge data from the fourth vehicle, wherein the fourth charge data is received before the fourth vehicle is positioned within the first queue;

receiving fifth charge data from the fourth vehicle, wherein the fifth charge data is received while the fourth vehicle is positioned within the first queue;

determining that a fourth charge time associated with the fourth charge data is less than a fifth charge time associated with the fifth charge data, wherein a difference between the fourth charge time and the fifth charge time is based on the fourth vehicle being charged using a solar panel while within the first queue; and re-assigning the fourth vehicle to a different position in the first queue or the second queue.

10. A system comprising one or more processing devices and one or more memory devices operably coupled to the one or more processing devices, the one or more memory devices storing executable code effective to cause the one or more processing devices to:

receive first charge data from a first vehicle, second charge data from a second vehicle, and third charge data from a third vehicle;

receive first departure time data from the first vehicle, second departure time data from the second vehicle, and third departure time data from the third vehicle;

determine that the first departure time data and the second departure time data are less than a first threshold value and the third departure time data is greater than the first threshold value;

determine, based on the first charge data and the second charge data, that a first charge time associated with the first vehicle is less than a second charge time associated with the second vehicle;

sort the first vehicle and the second vehicle into a first tier and the third vehicle into a second tier, wherein the first tier includes vehicles with a charge time less than the first threshold value, and wherein the second tier includes vehicles with a charge time greater than the first threshold value;

assign the first vehicle and the second vehicle to a first queue associated with a first charging coil at a charging location;

assign the third vehicle to a second queue associated with a second charging coil at the charging location;

assign a fourth vehicle to the first queue and a fifth vehicle to the second queue;

determine that the fourth vehicle at a third position in the first queue has a shorter estimated charging time or a sooner departure time than the fifth vehicle in a second position in the second queue, the second position being closer to a front of the second queue than the third position is to a front of the first queue; and assign the fourth vehicle to the second position in the second queue in front of the fifth vehicle.

11. The system of claim 10, wherein the first charge data, second charge data, and third charge data includes a state of charge and a battery capacity.

12. The system of claim 11, wherein the first charge data, second charge data, and third charge data further includes a charging speed of the first vehicle, the second vehicle, and the third vehicle; and wherein the executable code is further effective to cause the one or more processing devices to calculate an estimated charging time for the first vehicle, the second vehicle, and the third vehicle comprises calculating the estimated charging time according to the state of charge, battery capacity, and charging speed of the first vehicle, the second vehicle, and the third vehicle.

13. The system of claim 10, wherein the first charging coil for the first queue has a faster charging speed than the second charging coil for the second queue.

14. The system of claim 10, wherein the first vehicle is an autonomous vehicle.

15. The system of claim 10, wherein the executable code is further effective to cause the one or more processing devices to receive the first charge data and the first departure time data from the first vehicle over a vehicle-to-vehicle communication protocol.

16. A method comprising, by a computer system:
receiving first charge data from a first vehicle, second charge data from a second vehicle, and third charge data from a third vehicle;
receiving first departure time data from the first vehicle, second departure time data from the second vehicle, and third departure time data from the third vehicle;
determining that the first departure time data and the second departure time data are less than a first threshold value and the third departure time data is greater than the first threshold value;
determining, based on the first charge data and the second charge data, that a first charge time associated with the first vehicle is less than a second charge time associated with the second vehicle;
sorting the first vehicle and the second vehicle into a first tier and the third vehicle into a second tier, wherein the first tier includes vehicles with a charge time less than the first threshold value, and wherein the second tier includes vehicles with a charge time greater than the first threshold value;
assigning the first vehicle and the second vehicle to a first queue associated with a first charging coil at a charging location;
assigning the third vehicle to a second queue associated with a second charging coil at the charging location;
receiving fourth charge data from a fourth vehicle in the first queue, wherein the fourth charge data is received before the fourth vehicle is positioned within the first queue;
receiving fifth charge data from the fourth vehicle, wherein the fifth charge data is received while the fourth vehicle is positioned within the first queue;
determining that a fourth charge time associated with the fourth charge data is less than a fifth charge time associated with the fifth charge data, wherein a difference between the fourth charge time and the fifth charge time is based on the fourth vehicle being charged using a solar panel while within the first queue; and
assigning the fourth vehicle to a different position in the first queue or the second queue.

* * * * *